United States Patent 3,417,093
Patented Dec. 17, 1968

3,417,093
α-PHENYL-α(4-TERTIARY AMINO ALKOXYIMINO-2,5-CYCLOHEXADIENE-1-YLIDENE)ACETONITRILES AND PROCESS FOR PREPARING THEM
Gunther Seidl, Frankfurt am Main, and Georg Nesemann, Lorsbach, Taunus, Germany, assignors to Farbwerke Hoechst Aktiengesellschaft vormals Meister Lucius & Bruning, Frankfurt am Main, Germany, a corporation of Germany
No Drawing. Filed Feb. 16, 1965, Ser. No. 433,197
Claims priority, application Germany, Feb. 18, 1964, F 42,032
8 Claims. (Cl. 260—294.7)

ABSTRACT OF THE DISCLOSURE

Compounds of the formula

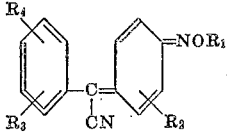

wherein $R_1$ is a tertiary aminoalkyl and $R_2$, $R_3$ and $R_4$ are chlorine or methyl, said compounds having fungicidal and parasiticidal properties.

---

The present invention relates to a process for preparing quinone-oxim compounds corresponding to the general Formula I

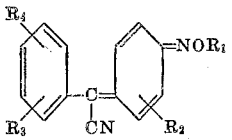

wherein $R_1$ is tertiary aminoalkyl having 2–3 carbon atoms between the hetero atoms and $R_2$ to $R_4$ are chlorine or methyl. The process comprises alkylating a quinone-oxim of the general Formula II

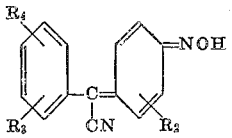

in which $R_2$ to $R_4$ have the meanings given above, with an alkylating agent of the general Formula III $$X—R_1 \qquad (III)$$

in which $R_1$ has the meaning given above and X stands for a halogen atom, an alkyl sulfonate group, an arylsulfonate group, or an alkylcarbonate group.

The starting compounds of the general Formula II can be obtained according to J. Org. Chem. 26, 4270 (1961), by condensation of aromatic nitro compounds with benzyl-cyanides. There can be used, for instance:

4-oxo-α-phenyl-2,5-cyclohexadiene-Δ¹,α-acetonitrile-oxim
4-oxo-α-dichlorphenyl-2,5-cyc hexadiene-Δ¹,α-acetonitrile-oxim
4-oxo-α-phenyl-chloro-2,5-cyclohexadiene-Δ¹,α-acetonitrile-oxim
4-oxo-α-phenyl-methyl-2,5-cyclohexadiene-Δ¹,α-acetonitrile-oxim
4-oxo-α-chlorphenyl-chloro-2,5-cyclohexadiene-Δ¹,α-acetonitrile-oxim The substituents at the benzene ring may be in 2-, 3-, 4-, 5- or 6-position, the substituents at the 2,5-cyclohexadiene ring in 2-, 3-, 5- or 6-position. [Nomenclature according to J. Org. Chem. 26, 4270 (1961)].

As starting compounds of the general Formula III there can be used: piperidino-ethyl-chloride, 1-dimethyl-aminopropyl-(3)-chloride, pyrrolidino-propyl-chloride.

As solvents for the alkylation an excess of the alkylating agent can be used, likewise liquids such as water, benzene, toluene, xylene, chlorobenzene, nitrobenzene, dichlorobenzene, dimethyl-formamide, dimethyl-sulfoxide, acetonitrile, methanol, ethanol, isobutanol, tertiary butanol, octanol, benzyl-alcohol, glycol, glycol-mono- and dimethyl ethers, diisopropyl-ether, di-n-octyl ether, tetrahydrofurane, dioxane, trichlor-ethylene, acetone, diethyl-ketone or mixtures thereof.

As acid-binding agents for the alkylation reaction there are mentioned bases such, for example, as alkali metal hydroxides, alkaline earth metal hydroxides as well as their amides, alcoholates, hydrides or carbonates. The alkylation is carried out at a temperature of between 10° and 160° C., preferably between 20° C. and 100° C. The period of reaction amounts to 1 to 15 hours. The molecular proportion of the components used may be varied within wide limits; preferably the oxim derivative II is reacted with an equivalent amount or with an excessive amount up to 50% of the alkylating agent and with an amount of 1 to 1.5 equivalents of the acid binding agent.

The reaction solution is then concentrated or, if solvents miscible with water are used, water is added and the reaction product is purified by chromatography. When preparing dialkylamino-alkyl compounds in a solvent immiscible with water the solution is shaken out with dilute acid, such as sulfuric acid or hydrochloric acid and the base is separated from the aqueous phase by adding an excessive amount of sodium hydroxide solution.

In contradistiction to the alkylation of oxims hitherto described which always leads to O-oxim ethers in addition to nitrones, i.e. to O-alkylation products in addition to N-alkylation products (cf. for instance, J. Am. Chem. Soc. 84 (1962), pages 1197–1204, especially page 1198, column 1) the reaction carried out according to the method of the present invention by which quinone-oxims are alkylated, surprisingly takes a completely uniform course. As can be proved by infrared spectroscopic examinations, exclusively O-oxim ethers are obtained in goods yields.

The products obtained by the process of the present invention can be used for combating fungi and parasites in humans and animals. In addition to a slight analgesic an anti-allergic action the compounds, especially those in which $R_1$ in the general formula I represents a basically substituted alkyl radical, show a very good efficiency on a large number of fungus strains such as skin fungi and rotting fungi as well as on parasites such as trichomonads; in numerous products obtained according to the process of the present invention the inhibiting concentration is already within the range of 1 microgram (γ) per milliliter. The serum factor is low. It is, for instance, possible to prepare a 1%-solution in propanol-dimethylformamide-ethanol in order to treat interdigital mycoses.

The preparation can likewise be incorporated into ointments and emulsions. When operating in this way, the addition of hydro-cortisone or prednisolone showing anti-phlogistic action may favour and improve the therapeutic effect in the case of weeping and eczematized mycoses. When dry, squamous mycoses are concerned, the therapeutic effect can be increased by the addition of salicylic acid.

It is likewise possible to treat bovines suffering from trichophyton infections with a solution of 1–5% strength in dilute dimethyl-sulfoxide or isopropanol.

Because of the high action the preparations exert on *Aspergillus niger*, they are likewise suitable for technical use. For instance, if added the dyestuffs and painting materials, they inhibit the moulding of the walls. By spraying hen houses with a 1% solution in dimethyl-formamide of 70% strength, the spreading of poultry aspergillosis can be combated. The products are likewise active on other micro-organisms such as Candida and phytopathogenic fungi.

The following examples serve to illustrate the invention but they are not intended to limit it thereto:

Example 1.—α-Phenyl-α(4-β-piperidino-ethoxy-imino-2,5-cyclohexadiene-1-ylidene)acetonitrile 22 grams of quinone-oxim 1 are alkylated and worked up with 1.2 equivalents of piperidino-ethyl-chloride as described in Example 6. 25 grams of piperidino-alkyl-ether are obtained in the form of a yellow-red oil whose oxalate melts at 146–147° C. (The naphthalene-1,5-disulfonate melts at 189–191° C.)

Example 2.—α-Phenyl - α(4 - gamma-dimethylamino-propyloxy - imino - 2,5 - cyclohexadiene-1-ylidene) acetonitrile (a) According to the method described in Example 6, 22 grams of quinone-oxim 1 are reacted with 1.2 equivalents of γ - dimethylaminopropyl-chloride and worked up. 26 grams of dimethylamino-propyl-ether are obtained in the form of a yellow-red oil. The oxalate melts at 177 to 179° C., the naphthalene-1,5-disulfonate at 192–196° C. The quaternary salt with methyl-iodide melts at 156–158° C.

(b) 22 grams of quinone-oxim 1 are heated together with 25 grams of di-γ-dimethylaminopropyl-carbonate and 2 grams of anhydrous potassium carbonate for 3 hours at 150° C. The reaction mixture is poured into water, shaken out with ether and the ether solution is concentrated. 18 grams of dimethyl-aminopropyl-ether are obtained whose oxalate melts at 177–179° C. The mixed melting point of the oxalate obtained according to Example 8a shows no depression.

Example 3.—α-Phenyl-α(4-gamma-pyrrolidino-propyl-oxy-imino-2,5-cyclohexadiene-1-ylidene)acetonitrile According to the method described in Example 6, 22 grams of quinone-oxim 1 are reacted with 1.2 equivalents of γ-pyrrolidino-propyl-chloride. The pyrrolidino-propyl-ether is obtained in a yield of 19 grams as a red oil. The oxalate melts at 148–151° C.

Example 4.—α - Phenyl-α(3-chloro-4-gamma-dimethyl-amino-propyloxy - imino-2,5-cyclohexadiene-1-ylidene) acetonitrile 25.7 grams of 4-oxo-α-phenyl-3-chloro-2,5-cyclohexadiene-Δ$^1$,α-acetonitrile-oxim are alkylated with dimethyl-amino-propyl-chloride according to the method described in Example 6. 27 grams of the above-mentioned base are obtained, whose oxalate melts at 164–166° C. The quaternary salt with methyl-iodide melts at 174–176° C.

Example 5.—α-(4-chlorophenyl)-α-(2-chloro-4-gamma-dimethylamino - propyloxy-imino-2,5-cyclohexadiene-1-ylidene)acetonitrile By alkylation of 29 grams of 4-oxo-α-4'-chlorophenyl-2 - chloro-2,5-cyclohexadiene-Δ$^1$,α-acetonitrile-oxim with γ-dimethylamino-propyl-chloride according to the method described in Example 6, 18 grams of the base are obtained whose oxalate melts at 138–141° C.

Example 6.—α - (3,4 - dichlorophenyl)-α-(4-gamma-di-methylamino-propyloxy-imino - 2,5 - cyclohexadiene-1-ylidene)acetonitrile The alkylation of 58 grams of 4-oxo-α-3',4'-dichloro-phenyl-2,5-cyclohexadiene-Δ$^1$,α-acetonitrile-oxim with dimethylamino-propyl-chloride is carried out as described in Example 6. 48 grams of the above-mentioned base are obtained which are purified by chromatography on aluminium oxide. The oxalate melts at 159–162° C., the quaternary salt with methyl-iodide at 195–196° C.

Example 7.—α-(2,4-dichlorophenyl) - α - (4-gamma-di-methylamino - propyloxy-imino-2,5-cyclohexadiene-1-ylidene)acetonitrile The alkylation of 58 grams of 4-oxo-α-2',4'-dichloro-phenyl-2,5-cyclohexadiene-Δ$^1$,α-acetonitrile-oxim with dimethylamino-propyl-chloride is carried out as described in Example 6. 60 grams of the above-mentioned base are obtained which are purified by chromatography on aluminium-oxide. The oxalate melts at 134–135° C., the quaternary salt with bromacetic acid-ethyl-ester melts at 116–118° C.

Example 8.—α - Phenyl-α(3-methyl-4-gamma-dimethyl-amino - propyloxy-imino-2,5-cyclohexadiene-1-ylidene) acetonitrile The alkylation of 54.3 grams of 4-oxo-α-phenyl-3-methyl-2,5-cyclohexadiene-Δ$^1$,α-acetonitrile-oxim with γ-dimethylamino-propyl-chloride is carried out as described in Example 6. 61 grams of the above-mentioned base are obtained whose oxalate melts at 154–156° C. The quaternary salt with methyl-iodide melts at 194–196° C.

We claim:
1. α - Phenyl-α(4-β-piperidino-ethoxy-imino-2,5-cyclo-hexadiene-1-ylidene)acetonitrile.
2. α - Phenyl-α(4-gamma-dimethylamino - propyloxy-imino-2,5-cyclohexadiene-1-ylidene)acetonitrile.
3. α - Phenyl-α(4-gamma-pyrrolidino-propyloxy-imino-2,5-cyclohexadiene-1-ylidene)acetonitrile.
4. α-Phenyl-α(3-chloro - 4 - gamma-dimethylamino-propyloxy - imino-2,5-cyclohexadiene-1-ylidene)acetonitrile.
5. α - (4-chlorophenyl)-α-(2-chloro - 4 - gamma-di-methylamino - propyloxyimino-2,5-cyclohexadiene-1-yl-idene)acetonitrile.
6. α(3,4-dichlorophenyl) - α - (4 - gamma-dimethyl-amino-propyloxy-imino - 2,5 - cyclohexadiene-1-ylidene) acetonitrile.
7. α-(2,4-dichlorophenyl) - α - (4 - gamma-dimethyl-amino-propyloxyimino - 2,5 - cyclohexadiene-1-ylidene) acetonitrile.
8. α-Phenyl-α(3-methyl - 4 - gamma-dimethylamino-propyloxy - imino-2,5-cyclohexadiene-1-ylidene)acetonitrile.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,362,614 | 11/1944 | Calva | 167—22 |
| 3,156,704 | 11/1964 | Davis | 260—396 |

OTHER REFERENCES

Seidl et al., Chemical Abstracts, vol. 63, p. 9878a (1965).

NICHOLAS S. RIZZO, *Primary Examiner.*

JOSE TOVAR, *Assistant Examiner.*

U.S. Cl. X.R.

260—326.5, 465; 167—30, 33, 58, 63